(12) United States Patent
Kobayashi et al.

(10) Patent No.: US 7,347,803 B2
(45) Date of Patent: Mar. 25, 2008

(54) DRIVE APPARATUS FOR HYBRID VEHICLE AND CONTROL METHOD AND CONTROL DEVICE THEREOF

(75) Inventors: Yasuhiko Kobayashi, Anjo (JP); Yasuo Yamaguchi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 181 days.

(21) Appl. No.: 11/257,998

(22) Filed: Oct. 26, 2005

(65) Prior Publication Data

US 2006/0089232 A1    Apr. 27, 2006

(30) Foreign Application Priority Data

Oct. 27, 2004  (JP)  ............................. 2004-312624
Nov. 4, 2004  (JP)  ............................. 2004-320799

(51) Int. Cl.
*B60W 10/02*  (2006.01)
*B60W 10/06*  (2006.01)
*B60W 10/08*  (2006.01)

(52) U.S. Cl. ..................... 477/5; 477/167; 192/48.8

(58) Field of Classification Search ............... 477/5, 477/167

See application file for complete search history.

(56) References Cited

U.S. PATENT DOCUMENTS 6,077,186 A * 6/2000 Kojima et al. ............... 477/3
6,176,807 B1  1/2001  Oba et al.
6,336,889 B1  1/2002  Oba et al.
6,581,705 B2  6/2003  Phillips et al.
2004/0152558 A1  8/2004  Takami et al.

FOREIGN PATENT DOCUMENTS

| JP | A-11-205907 | 7/1999 |
| JP | A-2003-129926 | 5/2003 |
| JP | A-2003-205768 | 7/2003 |
| JP | A-2004-82973 | 3/2004 |
| JP | A-2004-182101 | 7/2004 |
| JP | A-2004-211600 | 7/2004 |

* cited by examiner

*Primary Examiner*—Sherry Estremsky
*Assistant Examiner*—Edwin A Young
(74) *Attorney, Agent, or Firm*—Oliff & Berridge, PLC (57) ABSTRACT

A drive apparatus for a hybrid vehicle is provided with a motor, a clutch that transmits and cuts off a driving force between the motor and an engine, and a control device that performs an operation control for the motor and the clutch. If there is an engine start request during driving of a wheel by the motor, the control device increases an operating pressure of the clutch to start the transmission of torque from the motor to the engine side, and detects a transmission torque to be transmitted via the clutch. The control device also performs a control that sets an output torque of the motor as equal to a torque that is the sum of the transmission torque and a request torque for wheel driving, which is determined based upon an accelerator opening.

6 Claims, 8 Drawing Sheets

DRIVE APPARATUS FOR HYBRID VEHICLE AND CONTROL METHOD AND CONTROL DEVICE THEREOF

CROSS-REFERENCE TO RELATED APPLICATION

The disclosures of Japanese Patent Applications No. 2004-312624, filed on Oct. 27, 2004, and 2004-320799, filed on Nov. 4, 2004, from which priority is claimed, including the specification, drawings and abstract are incorporated herein by reference in their entireties.

This application is related to U.S. patent application Ser. No. 11/258,184, the disclosure of which is incorporated herein by reference thereto.

BACKGROUND

The disclosure relates to a drive apparatus mounted in a hybrid vehicle, which runs using both an engine and a motor, and a control method and control device therefor.

Art related to a control during engine starting in a drive apparatus mounted in a hybrid vehicle, the hybrid vehicle driven by both an engine and a motor, can be found, for example, in U.S. Pat. No. 6,581,705 (Cols. 1-6, FIGS. 1, 2A and 2B) of the family of Japanese Patent Laid-Open Publication No. 2003-129926 (pages 1-5, FIGS. 1, 2A and 2B) described below. The reference describes control for a parallel hybrid vehicle with an engine disconnect clutch. The purpose of the control is to engage the engine disconnect clutch and start the engine, while also maintaining a smooth vehicle response to a driver request using the motor. In this case, the motor is controlled throughout engine starting in a speed following control mode, which performs a control adapted to the torque required to obtain a desired setting speed. In other words, during engine starting, the engine disconnect clutch is first engaged and then the desired speed is issued to the motor, after which fuel is supplied to the engine to start the engine. Because the motor is controlled in the speed following control mode at this time, the output torque of the motor is controlled so as to maintain the desired speed, regardless of whatever magnitude of torque is required for starting the engine.

The reason such a control is performed in the speed following control mode is because no matter how much the torque required for engine starting fluctuates, the vehicle speed can be maintained at a predetermined speed and a smooth vehicle running condition can be maintained using a simple control in the speed following control mode.

Following engine start, a control is performed that calculates the desired engine torque, and then gradually decreases the motor torque while increasing the engine torque a proportional amount. This continues until the motor torque reaches zero. The vehicle speed is maintained throughout using, for example, a proportional/integral controller. In this case, the desired motor speed is set based upon a request from the driver and the overall vehicle operating condition. Either a trajectory or constant value therefor may be obtained based upon the acceleration and the vehicle speed at the present time and at a past point in time.

SUMMARY

According to such engine starting control art in a drive apparatus for a hybrid vehicle, the motor is controlled so as to ensure that the desired setting speed is obtained during engine starting, regardless of the magnitude of torque required for starting the engine. Therefore, engine starting can be performed while maintaining a constant vehicle speed and acceleration using the motor. However, it may not always be possible to secure a motor output torque in line with the torque required by the driver, in order to perform the speed following control for the motor.

In other words, the setting of the desired motor speed, while the speed following control is being performed, is merely an estimated value, which is calculated based upon the acceleration and the vehicle speed at the start of engine starting and at a previous time. Therefore, during engine starting, if there is an operation performed deviating from the estimated value, as in, for example, a case where there is a driver operation to change an accelerator opening, it is difficult to promptly output an output torque from the motor in response to such an operation. This consequently leads to an inability to ensure that a vehicle running condition promptly responds to a driver operation.

In view of the foregoing issues, it is an object to provide a drive apparatus for a hybrid vehicle and a control method therefor, which are capable of promptly outputting an appropriate output torque to a motor in response to a request, such as an accelerator operation by a driver, even when an engine is in the midst of starting.

To achieve the above object, if there is an engine start request during driving of a wheel by a motor, a transmission torque to be transmitted via a clutch is detected, and an output torque of the motor is set as equal to a torque that is the sum of the transmission torque and a request torque for wheel driving. Therefore, even if there are fluctuations in the torque magnitude required for engine starting, it is always possible to transmit the request torque for wheel driving, which is determined based upon an accelerator opening, to the wheel side. Accordingly, a suitable output torque can be output to the motor in response to a request, such as a driver's accelerator operation, even while engine starting is being performed.

In addition, a torque control is performed at this time that sets an output torque of the motor as equal to a torque that is the sum of the transmission torque and the request torque for wheel driving. Therefore, the motor can be controlled quicker and more accurately than when the motor torque is indirectly controlled as with a speed control or the like.

Furthermore, a constant relationship is established between the transmission torque to be transmitted via the clutch and an operating pressure of the clutch. Based on this relationship, the transmission torque can be calculated relatively easily from the operating pressure of the clutch. Therefore, the structure for detecting the transmission torque can be simplified.

By employing a control, the time required for starting the engine, and the amount of time the clutch is in a half-engaged state during that period, can be adjusted according to the accelerator opening and an accelerator opening change speed, which reflect the driver's will. For example, in a case such as when the accelerator opening is large and the changing speed therefor is fast, the driver can thus be assumed as demanding a large torque fast. Therefore, the time the clutch is slid in a half-engaged state can be shortened to quickly perform engine starting. On the other hand, in a case such as when the accelerator opening is small and the changing speed therefor is slow, the driver can be assumed as not demanding a large torque very fast. Therefore, a control or the like is possible that lengthens the time the clutch is slid in a half-engaged state to reduce shock during engagement of the clutch.

In addition, even if there are fluctuations in the torque magnitude required for engine starting, it is always possible to transmit the request torque for wheel driving, which is determined based upon the accelerator opening, to the wheel side. Accordingly, a suitable output torque can be output to the motor in response to a request such as a driver accelerator operation, even while engine starting is being performed.

Moreover, a torque control that is performed at this time sets the output torque of the motor as equal to a torque that is the sum of the transmission torque detected based upon the operating pressure of the clutch and the request torque for wheel driving. Therefore, a simple structure can be realized in which the motor is controlled more quickly and with greater accuracy than when the motor torque is indirectly controlled, as with a speed control or the like.

BRIEF DESCRIPTION OF THE DRAWINGS

The description will be made with reference to the drawings, in which.

DETAILED DESCRIPTION OF EMBODIMENTS

Hereinafter, a first exemplary embodiment will be described with reference to the accompanying drawings. A drive apparatus 1, according to the exemplary embodiments is mounted in a hybrid vehicle. It is a device that transmits driving force from either or both of a motor/generator M/G and an engine E to a wheel W, and when the engine E is stopped also transmits the driving force of the motor/generator M/G to the engine E to start the engine E. Hence, the drive apparatus 1 is structured with the motor/generator M/G, a first clutch C1, a transmission 2, that also functions as a second clutch C2, and a control device 3 that performs operation control for these units. The clutch C1 transmits and cuts off driving force between the motor/generator M/G and the engine E. The transmission 2 is disposed between the motor/generator M/G and the wheel W, and transmits and cuts off driving force to either or both the motor/generator M/G and the engine E. Furthermore, an output shaft 4 of the transmission 2 is connected to a differential gear 5, from which driving force is transmitted to the wheel W via a drive shaft 6. In this case, an internal combustion engine such as a gasoline engine, diesel engine, or the like is preferably used as the engine E.

Figure 1:
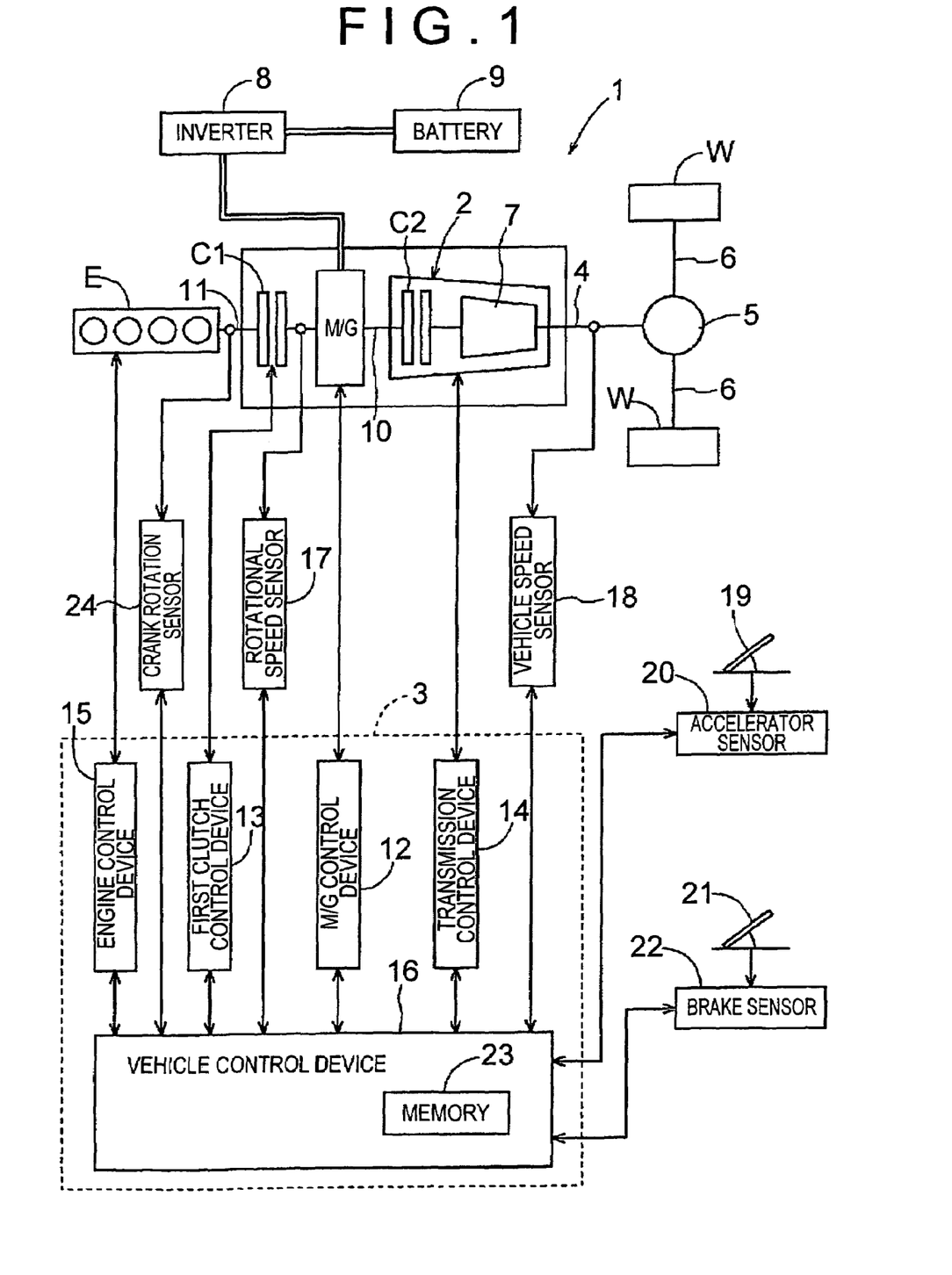
FIG. 1 is a schematic diagram showing a system configuration outline of a drive apparatus for a hybrid vehicle according to an exemplary embodiment.

As FIG. 1 shows, the system configuration of the drive apparatus 1 can be represented as a structure following a transmission route of driving force and connected in series in the order of the engine E, the first clutch C1, the motor/generator M/G, the transmission 2 (also functioning as the second clutch C2) and the wheel W. Also note that in FIG. 1, the internal portion of the transmission 2 is functionally represented as separated into the second clutch C2 and a speed change mechanism 7 in order to plainly show the system configuration of the drive apparatus 1 according to the embodiments.

The motor/generator M/G receives a supply of electric power from a battery 9, which has been converted from DC to AC by an inverter 8, and rotationally drives an intermediate shaft 10. One end of the intermediate shaft 10 is connected to a crankshaft 11 that synchronously rotates with a crankshaft (not shown) of the engine E, via the first clutch C1. Meanwhile, the other end is connected to the speed change mechanism 7 of the transmission 2 via the second clutch C2. Accordingly, the motor/generator M/G has a structure capable of starting (cranking) the engine E when the first clutch C1 is engaged, and capable of driving the wheel W when the second clutch C2 is engaged.

In addition, the motor/generator M/G is capable of operating as a generator when the intermediate shaft 10 is being driven by a driving force from the engine E or the wheel side. In this case, the electric power generated by the motor/generator M/G is converted from AC to DC by the inverter 8 and stored in the battery 9. Further, the operation control of the motor/generator M/G is performed based upon a control signal from an M/G control device 12 of the controller device 3.

The first clutch C1 is disposed between the motor/generator M/G and the engine E. It connects and separates the intermediate shaft 10, rotationally driven by the motor/generator M/G, and the crankshaft 11 that synchronously rotates with the crankshaft (not shown) of the engine E. Driving force is thus transmitted and cut off between the engine E and the motor/generator M/G.

Accordingly, when the engine E is stopped, engagement of the first clutch C1 makes it possible to transmit driving force from the motor/generator M/G to the engine E in order to start the engine E. While the engine E is operating, engagement of the first clutch C1 enables the transmission of driving force from the engine E to the wheel W via the transmission 2.

For use as the first clutch C1, a clutch such as a wet multiple disc clutch or the like is preferable. Such a clutch is capable of drive force transmission while slipping in a half-engaged state between a state of initiation of engagement and full engagement.

In addition, the operation control of the first clutch C1 is performed based upon a control signal from a first clutch control device 13 of the control device 3. Note that the first clutch C1 in the embodiments is equivalent to a "clutch" that is found in the claims attached.

The transmission 2 is disposed between the motor/generator M/G and the wheel W. It changes the speed of input rotation from the intermediate shaft 10, rotationally driven by the driving force of either or both of the motor/generator M/G and the engine E, to a desired gear ratio, which is then output to the output shaft 4. Moreover, the transmission 2 transmits and cuts off such driving force (rotation) to the output shaft 4.

Preferably the transmission 2 is a multi-speed or continuously variable automatic transmission. In the embodiments, a stepped automatic transmission with six speeds, etc. is used, for example, as the transmission 2. Such a transmission 2 includes a planetary gear train, for changing the speed of input rotation that is transmitted via the intermediate shaft 10 and output to the output shaft 4, to a desired gear ratio, as well as clutches and brakes, for performing operation control, of the planetary gear train. Furthermore, the transmission 2 is capable of switching to a desired speed by engaging and releasing the clutches and brakes of the planetary gear train, and also capable of maintaining an idling (neutral) state in which driving force input from the intermediate shaft 10 is not transmitted to the output shaft 4.

In other words, the transmission 2 is capable of switching between two states: a transmission state in which driving force of a selected desired speed is input from the intermediate shaft 10 and transmitted to the output shaft 4, and an idling state in which such driving force is not transmitted to the output shaft 4. In this manner, the transmission 2 also functions as the second clutch C2. Thus, as described above, from a functional standpoint, the transmission 2 can be considered as having the second clutch C2 and the speed change mechanism 7. In the embodiments, the operation control of the transmission 2 is performed based upon a control signal from a transmission control device 14 of the control device 3.

The control device 3 is provided with an engine control device 15 that performs an operation control for the engine E; the M/G control device 12 that performs the operation control for the motor/generator M/G; the first clutch control device 13 that performs the operation control for the first clutch C1; the transmission control device 14 that performs the operation control for the transmission 2; and a vehicle control device 16 that performs an operation control for the entire vehicle.

The vehicle control device 16 is configured to have respective detection signals input from a rotational speed sensor 17 that detects a rotational speed $\omega mg$ of the intermediate shaft 10; a crank rotation sensor 24 that detects a rotational speed $\omega e$ of the crankshaft 11; a vehicle speed sensor 18 that detects a rotational speed of the output shaft 4 of the transmission 2; an accelerator sensor 20 that detects a depressed amount (accelerator opening) of an accelerator pedal 19; and a brake sensor 22 that detects a depressed amount of a brake pedal 21. In addition, stored in a memory 23 of the vehicle control device 16 is a status flag (to be described later) set by the vehicle control device 16 based upon information from various portions of the vehicle.

Next, the operation control of the drive apparatus 1 according to the first exemplary embodiment will be described with reference to the accompanying drawings. As the FIGS. 2 to 7 show, in the first exemplary embodiment, the control device 3 performs a start control of the engine E, which follows two control patterns depending on the rotational speed of the motor/generator M/G, when there is an engine E start request during driving of the wheel W by only the motor/generator M/G. The two control patterns are a control pattern for high speed (control processing for "engine starting during high speed") and a control pattern for low speed (control processing for "engine starting during low speed"). The control pattern for high speed in the first exemplary embodiment relates to a claimed control. Hereinafter, operation controls of the drive apparatus 1 according to the first exemplary embodiment will be described in detail, centering on the operation control for starting of the engine E as noted.

Figure 2:
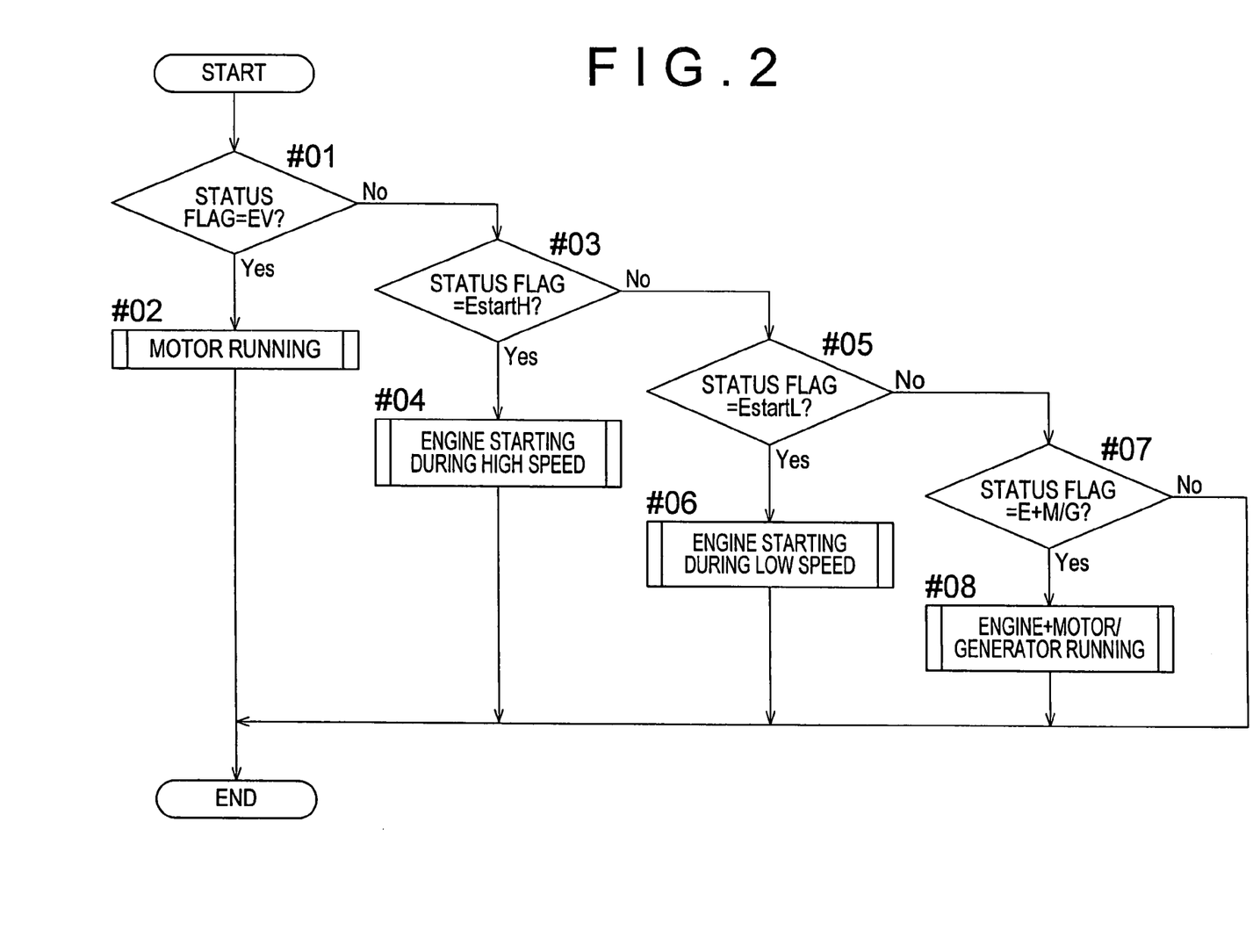
FIG. 2 is a flowchart showing a selection processing flow of control processing in the drive apparatus for a hybrid vehicle according to the exemplary embodiment.

FIG. 2 is a flowchart showing a processing flow in the control device 3 in the drive apparatus 1 according to the first exemplary embodiment when any one of four control processes are selected, the control processes being: 1) motor running, 2) engine starting during high speed, 3) engine starting during low speed, and 4) engine+motor/generator running. As the figure shows, if the status flag stored in the memory 23 is set to "EV", a state which indicates motor running (YES in step #01), the control device 3 selects and executes the control processing for motor running (step #02). If the status flag is set to "EstartH", a state which indicates engine starting during high speed (YES in step #03), the control device 3 selects and executes the control processing for engine starting during high speed (step #04). If the status flag is set to "EstartL", a state which indicates engine starting during low speed (YES in step #05), the control device 3 selects and executes the control processing for engine starting during low speed (step #06). Furthermore, if the status flag is set to "E+M/G", a state which indicates engine+motor/generator running (YES in step #07), the control device 3 selects and executes the control processing for engine+motor/generator running (step #08).

The status flag is set in the vehicle control device 16 based upon information from various elements of the vehicle, including the accelerator sensor 20, the brake sensor 22, the vehicle speed sensor 18, and the rotational speed sensor 17. Moreover, the status flag is stored in the memory 23. More specifically, it should be noted that the status flag can be set based upon a comparison of information from various elements of the vehicle and a running condition map that uses such information as parameters.

Figure 3:
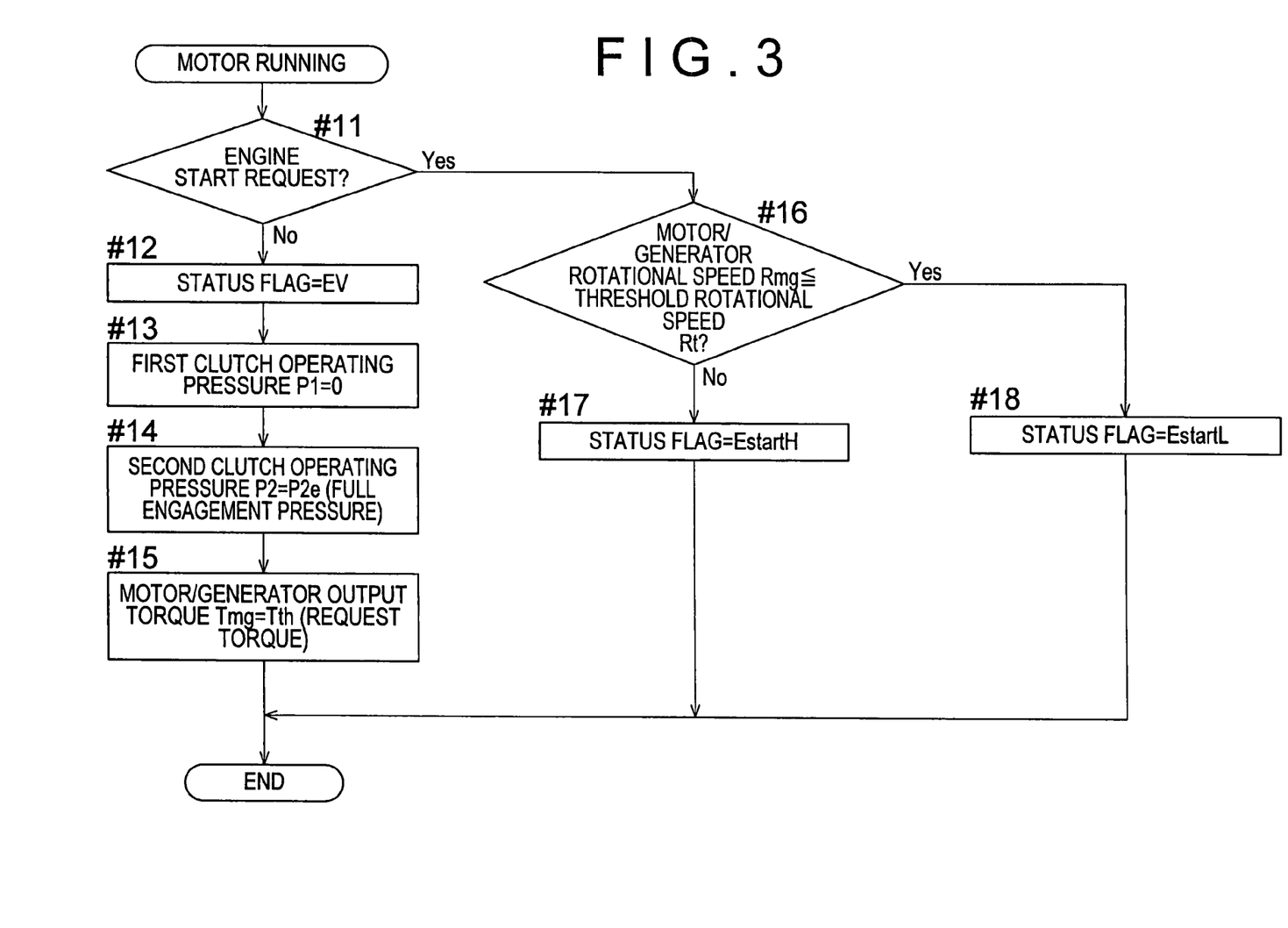
FIG. 3 is a flowchart showing the details of control processing for motor running in step #02 of the flowchart of FIG. 2.

FIG. 3 is a flowchart showing the details of the control processing for motor running in step #02 of the flowchart in FIG. 2. In this case, the engine start request is output from the vehicle control device 16 to the engine control device 15, the M/G control device 12, the first clutch control device 13, and the transmission control device 14. It is output in cases such as when the accelerator opening increases and sufficient output torque cannot be generated by the motor/generator M/G alone, or when the remaining amount in the battery 9 for driving the motor/generator M/G becomes small. As the figure shows, in the control processing for motor running, until there is an engine start request (NO in step #11), the status flag stored in the memory 23 stays set to "EV", which indicates motor running (step #12).

Next, the control device 3 sets an operating pressure P of the first clutch C1 to zero (step # 13), and sets an operating pressure P2 of the second clutch C2 to a full engagement pressure P2$e$ at which the second clutch C2 reaches a state of full engagement (step #14). In addition, the control device 3 operates the motor/generator M/G such that an output torque Tmg of the motor/generator M/G coincides with a request torque Tth (step #15).

In this case, the request torque Tth, which is equivalent to a "wheel driving request torque", is set in the vehicle control device 16 based upon information regarding the accelerator opening detected by the accelerator sensor 20. At this time, the output torque may differ with respect to the accelerator opening to that which would occur during running by the engine and simultaneous running by the motor/generator M/G. To prevent this, the relationship between the accelerator opening and the output torque Tmg of the motor/generator M/G should preferably match a relationship between the accelerator opening and the output torque of the engine. Accordingly, the request torque Tth here is set according to the accelerator opening detected by the accelerator sensor 20 so as to coincide with the output torque of the engine for the accelerator opening at that time. Thus, the driver feels no differences during motor running, and motor running can be achieved that reflects an output request based on the accelerator operation of the driver.

Next, if there is an engine start request (YES in step #11), the control device 3 determines whether a rotational speed Rmg of the motor/generator M/G is equal to or less than a threshold rotational speed Rt (step #16). In the embodiment, the rotational speed Rmg of the motor/generator M/G is detected based upon the detection signal from the rotational speed sensor 17, which detects the rotational speed of the intermediate shaft 10.

The threshold rotational speed Rt is set to a rotational speed equal to or greater than a rotational speed of the motor/generator M/G at which the engine E can be started with the first clutch C1 in a state of full engagement. That is, the threshold rotational speed Rt is set so as to become equal to or greater than a rotational speed at which a cranking rotational speed of the engine E is capable of starting the engine E using driving force from the motor/generator M/G when the first clutch C1 is in a state of full engagement. More specifically, it should be set to approximately the idling rotational speed of the engine E, preferably about 600 to 700 rpm, for example.

If the rotational speed Rmg of the motor/generator M/G is not equal to or less than the threshold rotational speed Rt (NO in step #16), the control device 3 sets the status flag stored in the memory 23 to "EstartH", which indicates engine starting during high speed (step #17). Thus, the control (step #04) for engine starting during high speed is performed as shown in the flowchart of FIG. 2. However, if the rotational speed Rmg of the motor/generator M/G is equal to or less than the threshold rotational speed Rt (YES in step #16), the control device 3 sets the status flag stored in the memory 23 to "EstartL", which indicates engine starting during low speed (step #18). Thus, the control (step #06) for engine starting during low speed is performed as shown in the flowchart of FIG. 2. The control processing for motor running is then ended.

Figure 4:
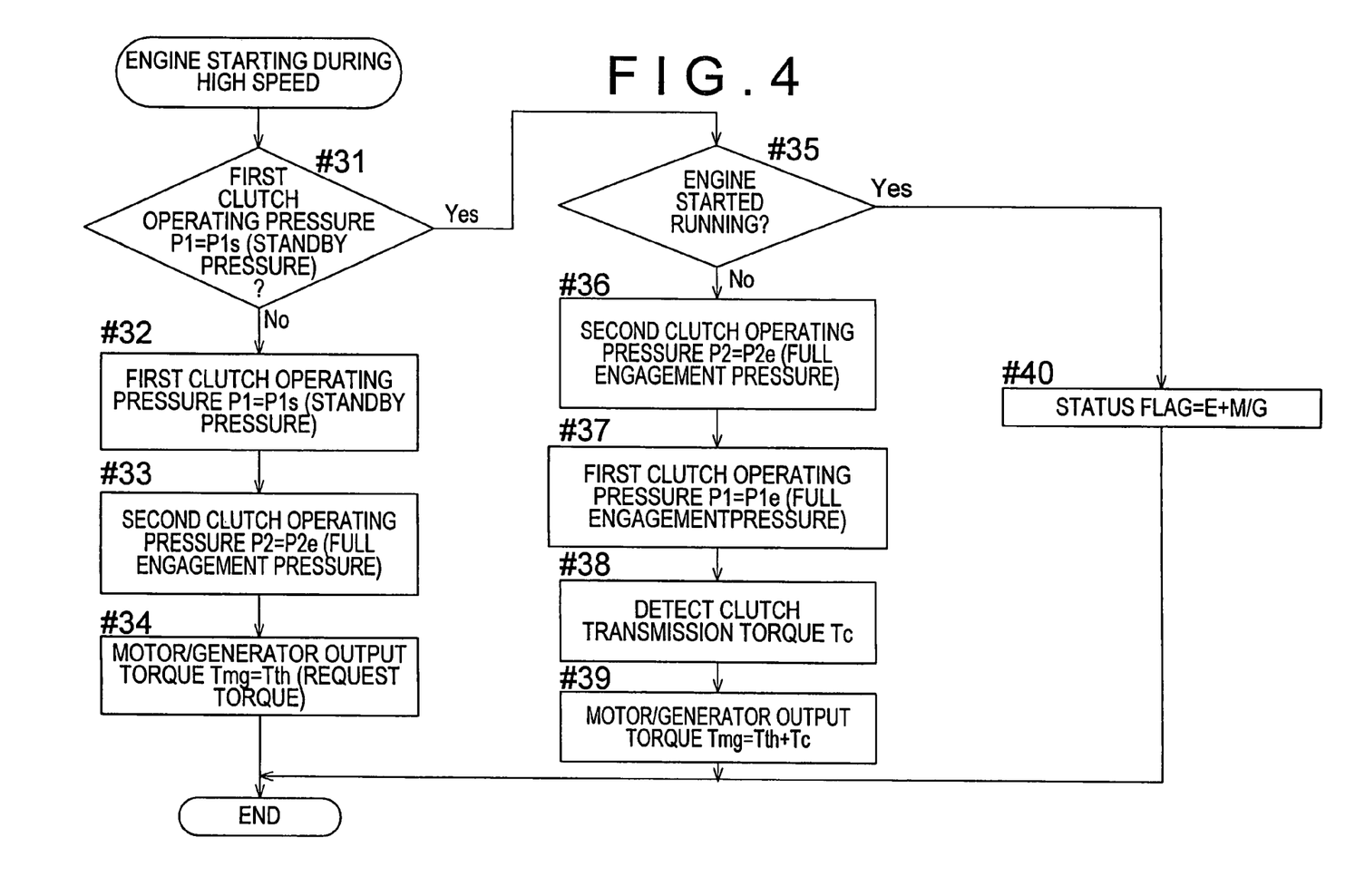
FIG. 4 is a flowchart showing the details of control processing for engine starting during high speed in step #04 of the flowchart of FIG. 2.

FIG. 4 is a flowchart showing the details of the control processing for engine starting during high speed of step #04 of the flowchart in FIG. 2. As the figure shows, in the control processing for engine starting during high speed, the control device 3 first determines whether the operating pressure P1 of the first clutch C1 has reached a standby pressure P1s (step #31). If the operating pressure P1 of the first clutch C1 does not equal the standby pressure P1s (NO in step #31), then the control device 3 sets the operating pressure P1 of the first clutch C1 to the standby pressure P1s (step #32). The standby pressure P1s of the first clutch C1 here is a pressure for setting the first clutch C1 in a preparation state prior to initiation of engagement. That is, the standby pressure P1s is preferably a pressure that operates the first clutch C1 until the state immediately prior to initiation of engagement.

Next, in a state where the operating pressure P2 of the second clutch C2 is set to a full engagement pressure P2e (step #33), the motor/generator M/G is operated so as to coincide the output torque Tmg of the motor/generator M/G with the request torque Tth (step #34).

However, if the operating pressure P1 of the first clutch C1 has reached the standby pressure P1s (YES in step #31), the control device 3 determines whether the engine E has reached a running state (step #35). It is determined whether the engine has reached a running state based upon detection signals input to the engine control device 15 from various sensors provided in the engine.

If the engine E has not reached a running state (NO in step #35), the control device 3 leaves the operating pressure P2 of the second clutch C2 unchanged as equal to the full engagement pressure P2e (step #36). Meanwhile, the operating pressure P1 of the first clutch C1 is increased until it reaches a full engagement pressure P1e at which the first clutch C1 reaches a state of full engagement (step #37). In the embodiment, a control for increasing the operating pressure P1 of the first clutch C1 up to the full engagement pressure P1e is a feedback control that detects a slipping amount of the first clutch C1 and then increases the operating pressure P1 of the first clutch C1 until the slipping amount reaches zero.

More specifically, as expressed in Equation (1) below, the rotational speed $\omega mg$ of the intermediate shaft 10, rotationally driven by the motor/generator M/G and the rotational speed $\omega e$ of the crankshaft 11 synchronously rotating with the crankshaft of the engine E, are respectively detected. Depending on the difference between the rotational speed $\omega mg$ of the intermediate shaft 10 and the rotational speed $\omega e$ of the crankshaft 11, feedback control is performed that increases the operating pressure P1 of the first clutch C1 until the difference becomes zero. Thus, the operating pressure P1 of the first clutch C1 at the point where $\omega mg - \omega e = 0$ according to Equation (1) is the full engagement pressure P1e.

$$P1 = Gp(\omega mg - \omega e) + Gi \int (\omega mg - \omega e) dt, \quad (1)$$

where Gp is the proportional gain, Gi is the integral gain, and dt is the control cycle. The rotational speed $\omega mg$ of the intermediate shaft 10 and the rotational speed $\omega e$ of the crankshaft 11 can be detected by the rotational speed sensor 17 and the crank rotation sensor 24, respectively. It should be noted that in the configuration according to the exemplary embodiments, the rotational speed $\omega mg$ of the intermediate shaft 10 coincides with a rotational speed on the motor/generator M/G side of the first clutch C1, and the rotational speed $\omega e$ of the crankshaft 11 coincides with a rotational speed on the engine E side of the first clutch C1.

According to the first exemplary embodiment, the proportional gain Gp and the integral gain Gi are set as fixed values. The values for the proportional gain Gp and the integral gain Gi are preferably set based upon tests, or the like, of values at which sufficient response can be obtained with little overshoot or hydraulic vibration in the operating pressure P1 of the first clutch C1.

Next, a clutch transmission torque Tc that is transmitted from the motor/generator M/G to the engine E side via the first clutch C1 is detected (step #38). The clutch transmission torque Tc is equivalent to a torque from the motor/generator M/G transmitted via the first clutch C1 that is used for cranking and starting the engine E.

Detection of the clutch transmission torque Tc can be achieved, for example, by calculating the clutch transmission torque Tc in the vehicle control device 16 based upon the operating pressure P1 of the first clutch C1. In other words, as described above, a control has been performed to increase the operating pressure P1 of the first clutch C1 at this time up to the full engagement pressure P1e (step #37). Thus, as the transmitted torque increases, so does the operating pressure P1 for engagement of the first clutch C1. Consequently, the operating pressure P1 of the first clutch C1 has a constant relationship with the clutch transmission torque Tc, which is transmitted by the first clutch C1. Therefore, it is possible to calculate the clutch transmission torque Tc in the vehicle control device 16, based upon the operating pressure P1 of the first clutch C1. For this purpose, an equation or a table is used that describes the relationship between the clutch transmission torque Tc and the operating pressure P1 of the first clutch C1.

More specifically, the clutch transmission torque Tc can be approximately calculated based upon Equation (2) below:

$$Tc = a \times (b \times P1 - c), \qquad (2)$$

where a, b and c are constants that are determined by properties of the first clutch C1. For example, the constant a may be determined by the number of clutch discs in the first clutch C1, the clutch shape, and friction material properties; the constant b may be determined by a piston area of the first clutch C1; and the constant c may be determined by a piston spring load of the first clutch C1.

Furthermore, the values for constants a, b and c are preferably different values that take into account hysteresis generated by the piston operating direction (engagement and release directions) of the first clutch C1. Also note that Equation (2) may be converted into a table and stored in the memory 23 of the vehicle control device 16 or the like, and the clutch transmission torque Tc may be calculated based upon the table.

Next, the control device 3 operates the motor/generator M/G such that the output torque Tmg of the motor/generator M/G reaches a torque that is the sum of the request torque Tth and the clutch transmission torque Tc (step #39). Thus, it is possible to start the engine E while the output request generated by the accelerator operation of the driver is reflected on the running motor. Also note that the request torque Tth, as described above, is set in the vehicle control device 16 based upon information regarding the accelerator opening detected by the accelerator sensor 20.

If the engine E has reached a running state (YES in step #35), the control device 3 sets the status flag stored in the memory 23 to "E+M/G", which indicates engine+motor/generator running (step #40). Thus, the control (step #08) for engine+motor/generator running is performed as shown in the flowchart of FIG. 2. The control processing for engine starting during high speed is then ended.

Figure 6:
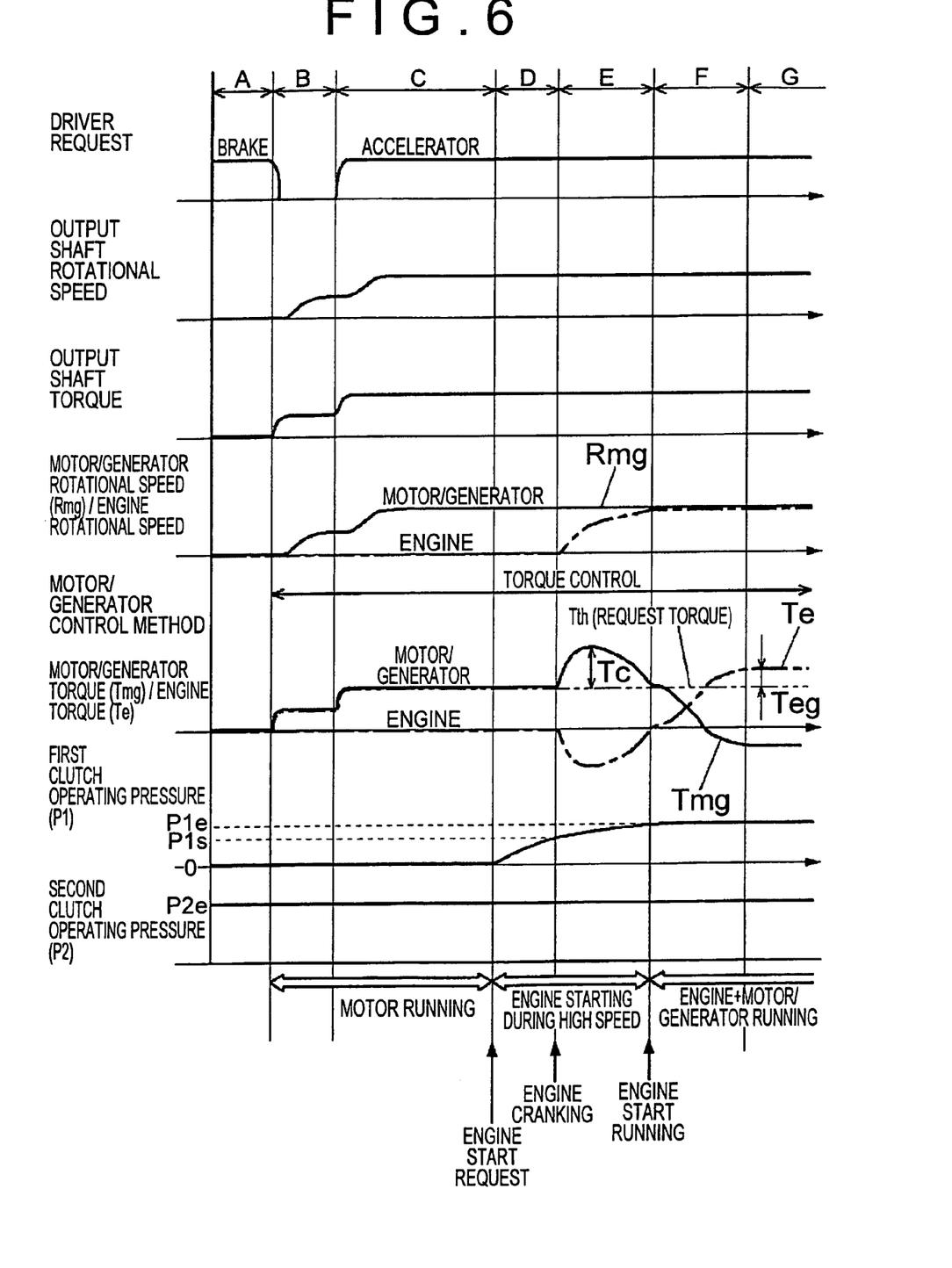
FIG. 6 is an example of a timing chart showing operating conditions of various portions when starting of an engine E is performed according to the control processing for "engine starting during high speed" in the drive apparatus for a hybrid vehicle according to the exemplary embodiment.

FIG. 6 is an example of a timing chart showing operating conditions of various portions when starting of an engine E is performed according to the control processing for "engine starting during high speed" after motor running is performed subsequent to the vehicle being stopped. In the example as shown in the figure, the vehicle is stopped with the brake pedal being depressed by the driver (area A). Once the brake pedal is released by the driver, the control device 3 accordingly starts rotational driving of the motor/generator M/G. The control device 3 then outputs torque that slowly advances the vehicle, similar to the creeping of a vehicle with an automatic transmission that has a torque converter (area B). Thus, motor running is started. When the accelerator pedal 19 is subsequently depressed by the driver, the control device 3 operates the motor/generator M/G so as to coincide the output torque Tmg of the motor/generator M/G with the request torque Tth (see step #15 in FIG. 3), and performs motor running (area C).

Next, if an engine start request has been output from the vehicle control device 16, the control device 3 starts the control for engine starting during high speed. Namely, the operating pressure P1 of the first clutch C1 is set to the standby pressure P1s (see step #32 in FIG. 4), and the first clutch C1 is operated until it reaches the state immediately prior to initiation of engagement (area D). Thereafter, while the operating pressure P1 of the first clutch C1 continues to increase until it reaches the full engagement pressure P1e (see step #37 in FIG. 4), the clutch transmission torque Tc is detected based upon the operating pressure P1 of the first clutch C1 as described above (see step #38 in FIG. 4). The motor/generator M/G is then operated such that the output torque Tmg of the motor/generator M/G reaches a torque that is the sum of the request torque Tth and the clutch transmission torque Tc (see step #39 in FIG. 4) to start the engine E (area E). Note that in the example shown in FIG. 6, the engine start request indicates a case in which such a request is output according to a decrease in the remaining amount in the battery 9, and not according to an increase in the accelerator opening.

After the engine E has started running, engine+motor/generator running is started. At this time, the output torque Tmg of the motor/generator M/G is decreased while an output torque Te of the engine E is increased, with the request torque Tth kept satisfied and unchanged. In this manner, the proportion of output torque Te of the engine E is continuously increased (area F). With the engine+motor/generator running in a steady state, the output torque Te of the engine E becomes equal to a torque that is the sum of the request torque Tth and a torque (electricity generating torque) Teg required for generating electricity by the motor/generator M/G. Thus while the vehicle runs on the output torque Te of the engine E, the motor/generator M/G is operated as a rotationally driven generator (area G).

It should be noted that during the series of operations shown in FIG. 6, the operating pressure P2 of the second clutch C2 remains unchanged as the full engagement pressure P2e. Furthermore, when the control processing for engine starting during high speed is being executed, the motor/generator M/G is controlled by a torque control throughout the regions B to G.

Figure 5:
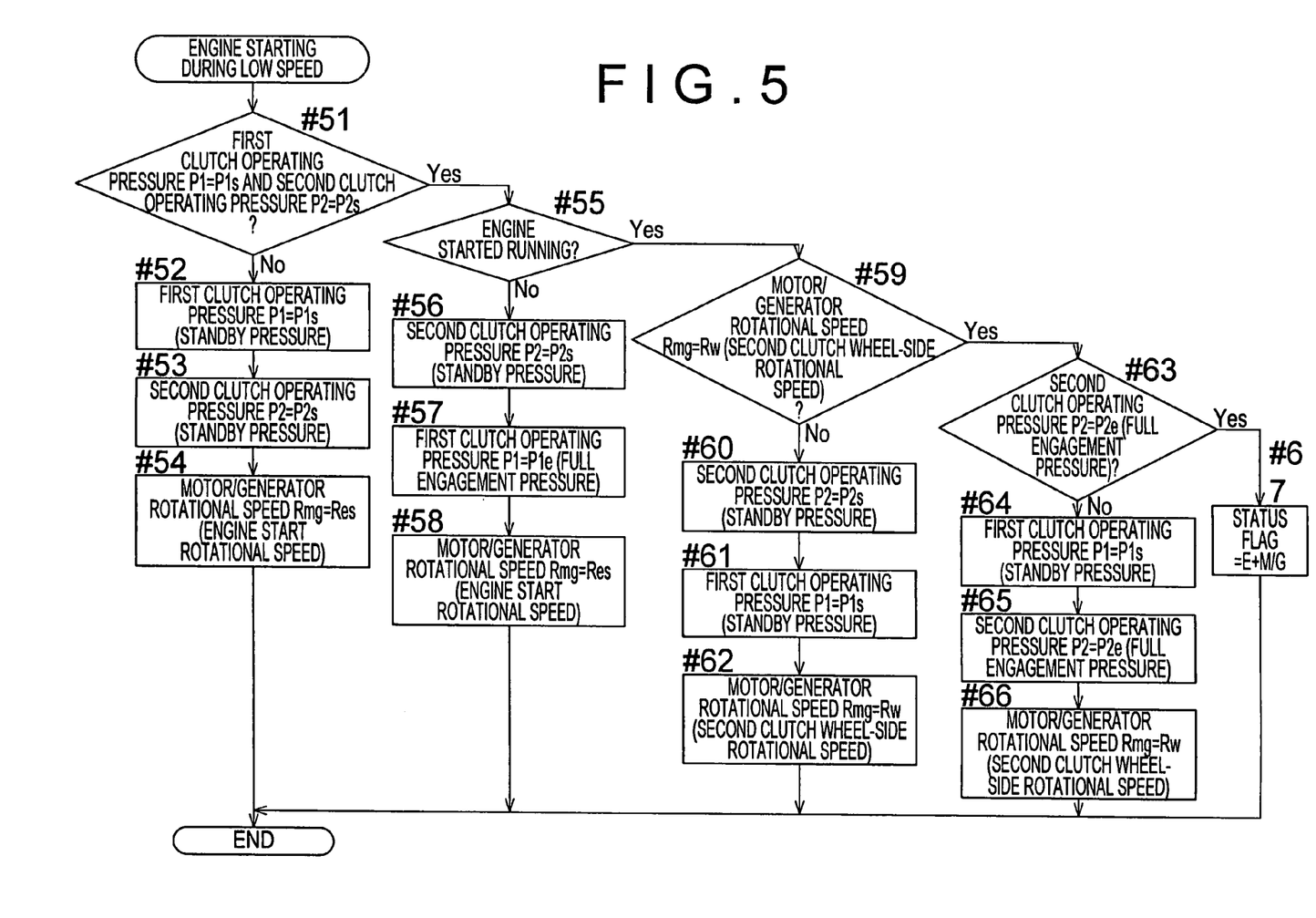
FIG. 5 is a flowchart showing the details of control processing for engine starting during low speed in step #06 of the flowchart of FIG. 2.

FIG. 5 is a flowchart showing the details of control processing for engine starting during low speed in step #06 of the flowchart in FIG. 2. As the figure shows, in the control processing for engine starting during low speed, the control device 3 first determines whether the operating pressure P1 of the first clutch C1 is the standby pressure P1s, and whether the operating pressure P2 of the second clutch C2 is the standby pressure P2s (step #51). If that is not the case (NO in step #51), then the control device 3 sets the operating pressure P1 of the first clutch C1 to the standby pressure P1s (step #52). The standby pressure P1s of the first clutch C1 is a pressure for setting the first clutch C1 in a preparation state prior to initiation of engagement. Also, the standby pressure P1s is preferably a pressure that operates the first clutch C1 until the state immediately prior to initiation of engagement.

Next, the control device 3 sets the operating pressure P2 of the second clutch C2 to the standby pressure P2s (step #53). The standby pressure P2s of the second clutch C2 here is a pressure for setting the second clutch C2 in a released state. It may also be set as an arbitrary pressure between zero pressure and a pressure for setting the second clutch C2 in a state immediately prior to initiation of engagement.

Next, the control device 3 performs a rotational speed control so as to maintain the rotational speed Rmg of the motor/generator M/G at an engine start rotational speed Res (step #54). The engine start rotational speed Res, similar to the threshold rotational speed Rt, is set to a rotational speed equal to or greater than a rotational speed of the motor/generator M/G at which the engine E can be started with the first clutch C1 in a state of full engagement. More specifically, it should be set to approximately the idling rotational speed of the engine E, preferably about 600 to 700 rpm, for example.

Note that such a rotational speed control for maintaining the rotational speed Rmg of the motor/generator M/G at a predetermined rotational speed can be performed by controlling the output torque Tmg of the motor/generator M/G, such that the motor/generator M/G reaches the predetermined rotational speed regardless of the load acting on the intermediate shaft 10.

If the operating pressure P 1 of the first clutch C1 is the standby pressure P1s, and the operating pressure P2 of the second clutch C2 is the standby pressure P2s (YES in step #51), the control device 3 determines whether the engine E has reached a running state (step #55). It is determined whether the engine has reached a running state based upon detection signals input to the engine control device 15 from various sensors provided in the engine.

If the engine E has not reached a running state (NO in step #55), the control device 3 leaves the operating pressure P2 of the second clutch C2 unchanged as equal to the standby pressure P2s (step #56). Meanwhile, the operating pressure P1 of the first clutch C1 is increased until it reaches a full engagement pressure P1e at which the first clutch C1 reaches a state of full engagement (step #57). During this time, the rotational speed control is also performed to maintain the rotational speed Rmg of the motor/generator M/G at the engine start rotational speed Res (step #58).

By increasing the operating pressure P1 of the first clutch C1 up to the full engagement pressure P1e at this time, the first clutch C1 passes through a state of half-engagement to become fully engaged. Therefore, the intermediate shaft 10 rotationally driven by the motor/generator M/G and the crankshaft 11 synchronously rotating with the crankshaft (not shown) of the engine E are connected. Accordingly, the crankshaft of the engine E is rotated by the driving force of the motor/generator M/G. In order to maintain the rotational speed of the motor/generator M/G at the engine start rotational speed Res, the output torque Tmg of the motor/generator M/G is increased only by the amount of torque required to crank the engine E (see area K in FIG. 7).

Thus, the second clutch C2 is released so that the motor/generator M/G is set to an idling state in which the driving force therefrom is not transmitted to the output shaft 4, and a state (idle running state) is achieved in which fluctuations in the rotational speed Rmg of the motor/generator M/G do not affect the running condition of the vehicle. In such a state, the rotational speed Rmg of the motor/generator M/G can be increased up to a rotational speed at which the engine E can be started so as to perform starting of the engine E. Accordingly, even in cases where the rotational speed of the motor/generator M/G is low during motor running, the engine E can be reliably started, while maintaining a smooth operating condition of the wheel W in which fluctuations in the rotational speed Rmg of the motor/generator M/G are not transmitted to the wheel W during engine E starting.

If the engine E has reached a running state (YES in step #55), the control device 3 determines whether the rotational speed Rmg of the motor/generator M/G is a rotational speed (hereinafter referred to as a "second clutch wheel-side rotational speed") Rw in accordance with a rotational speed on the wheel W side of the second clutch C2 (step #59).

The second clutch wheel-side rotational speed Rw here is a rotational speed of the motor/generator M/G when the rotational speeds on the motor/generator M/G side (intermediate shaft 10 side) and wheel W side (speed change mechanism 7 side) of the second clutch C2 become almost identical within a predetermined difference in range. That is, the second clutch wheel-side rotational speed Rw is a rotational speed that differs depending on the speed selected in the speed change mechanism 7 and the vehicle running speed at that time. The vehicle running speed here can be detected by the vehicle speed sensor 18. Also note that the speed of the speed change mechanism 7 is controlled by the transmission control device 14.

Furthermore, in the determination made in step #59, the second clutch wheel-side rotational speed Rw is set to a value with a constant range, and it is preferable if a condition is determined as satisfied once the rotational speed Rmg of the motor/generator M/G falls within the range of the second clutch wheel-side rotational speed Rw.

If the rotational speed Rmg of the motor/generator M/G is not equal to the second clutch wheel-side rotational speed Rw (NO in step #59), the control device 3 leaves the operating pressure P2 of the second clutch C2 unchanged as equal to the standby pressure P2s (step #60). Meanwhile, the operating pressure P1 of the first clutch C1 is set to the standby pressure P1s (step #61). The rotational speed control is also performed to set the rotational speed Rmg of the motor/generator M/G to the second clutch wheel-side rotational speed Rw (step #62).

The rotational speed control for setting the rotational speed Rmg of the motor/generator M/G to the second clutch wheel-side rotational speed Rw is based upon a second clutch wheel-side rotational speed Rw that is determined from information regarding the vehicle running speed detected by the vehicle speed sensor 18, and the speed selected in the speed change mechanism 7. Setting of the rotational speed Rmg of the motor/generator M/G to the second clutch wheel-side rotational speed Rw can be achieved by calculating the required output torque Tmg of the motor/generator M/G and then controlling the motor/generator M/G in accordance with the calculation results.

In this manner, the rotational speeds on the motor/generator M/G side and wheel W side of the second clutch C2 coincide. It is thus possible to suppress the generation and transmission of fluctuations in the driving force to the wheel side, through absorption of the difference in rotational speeds on the motor/generator M/G side and wheel W side when engaging the second clutch C2. Consequently, the smooth operating condition of the wheel can be maintained, and the application of a large load on the second clutch C2 during engagement of the second clutch C2 is suppressed.

If the rotational speed Rmg of the motor/generator M/G is equal to the second clutch wheel-side rotational speed Rw (YES in step #59), the control device 3 determines whether the operating pressure P2 of the second clutch C2 has reached the full engagement pressure P2e (step #63). That is, it is determined whether the second clutch C2 is fully engaged. If the operating pressure P2 of the second clutch C2 has not reached the full engagement pressure P2e (NO in step #63), the operating pressure P1 of the first clutch C1 is left unchanged as equal to the standby pressure P1s (step

64) and the operating pressure P2 of the second clutch C2 is set to the full engagement pressure P2e (step #65). During this time, the rotational speed control is also performed to maintain the rotational speed Rmg of the motor/generator M/G at the second clutch wheel-side rotational speed Rw (step #66). Thus, a state can be achieved in which the smooth operating condition of the wheel is maintained with the wheel W driven by the driving force of the motor/generator M/G.

Next, if the operating pressure P2 of the second clutch C2 has reached the full engagement pressure P2e (YES in step #63), the control device 3 sets the status flag stored in the memory 23 to "E+M/G", which indicates engine+motor/generator running (step #67). Thus, the control (step #08) for engine+motor/generator running is performed as shown in the flowchart of FIG. 2. The control processing for engine starting during low speed is then ended.

Figure 7:
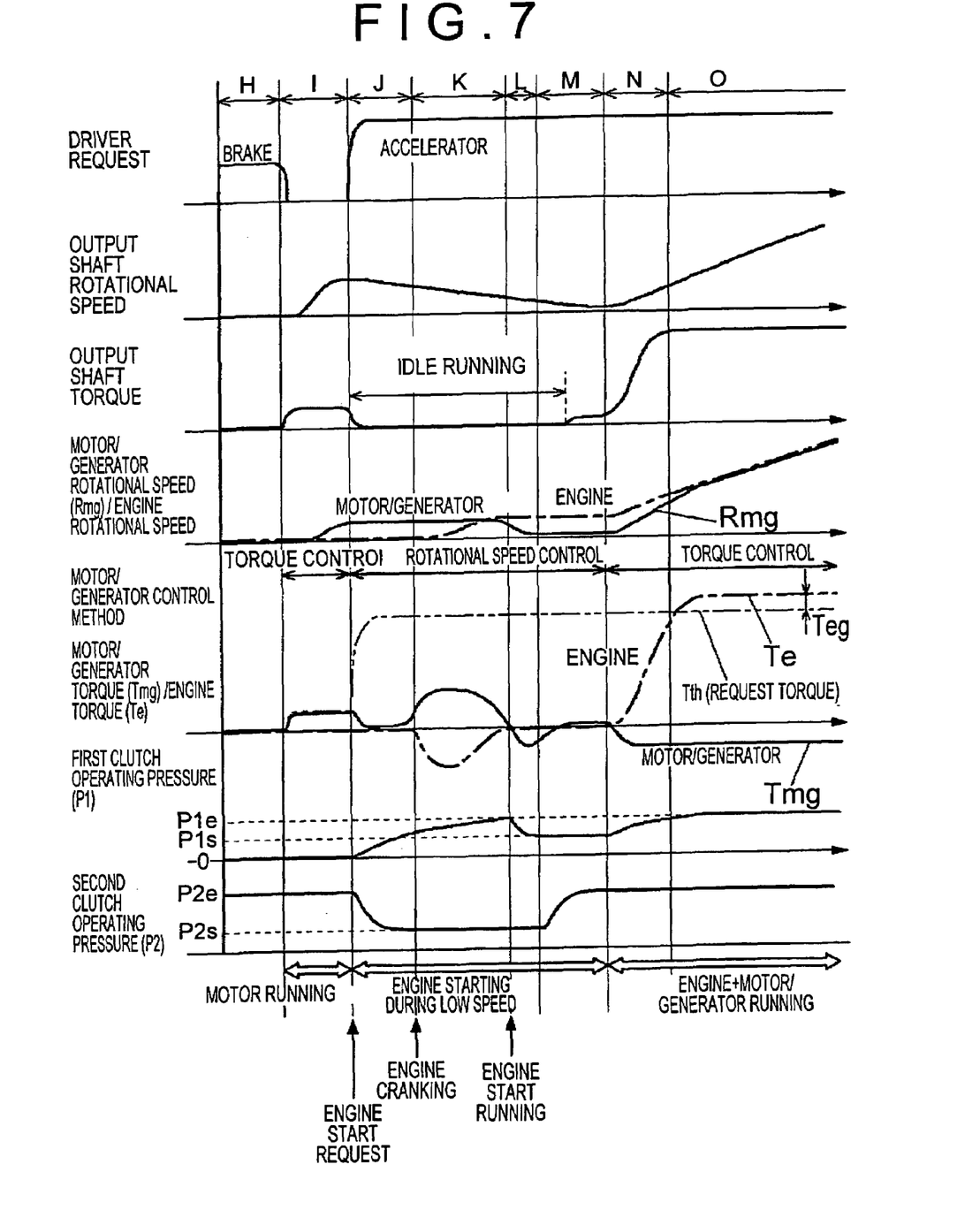
FIG. 7 is an example of a timing chart showing operating conditions of various portions when starting of an engine E is performed according to the control processing for "engine starting during low speed" in the drive apparatus for a hybrid vehicle according to the exemplary embodiment.

FIG. 7 is an example of a timing chart showing operating conditions of various portions when starting of an engine E is performed according to the control processing for "engine starting during low speed" after motor running is performed subsequent to the vehicle being stopped. In the example, as shown in the figure, the vehicle is stopped with the brake pedal being depressed by the driver (area H). Once the brake pedal is released by the driver, the control device 3 accordingly starts rotational driving of the motor/generator M/G. The control device 3 then outputs torque that slowly advances the vehicle, similar to the creeping of a vehicle with an automatic transmission that has a torque converter (area I). Thus, motor running is performed.

Next, once the accelerator pedal 19 is depressed by the driver, the control device 3 starts the control for engine starting during low speed. In the example as shown in FIG. 7, the vehicle is first slowly moving forward with the accelerator pedal 19 not depressed. Following this state, the accelerator pedal 19 is depressed so hard that the output torque of only the motor/generator M/G becomes insufficient. Therefore, engine starting in this control is performed with the rotational speed Rmg of the motor/generator M/G at a low rotational speed that is equal to or less than the threshold rotational speed Rt. Namely, the operating pressure P1 of the first clutch C1 is set to the standby pressure P1s (see step #52 in FIG. 5), and the operating pressure P2 of the second clutch C2 is set to the standby pressure P2s (see step #53 in FIG. 5). An idling state (idle running state) is then achieved in which the driving force of the motor/generator M/G is not transmitted to the output shaft 4 (area J). At this time, the control device 3 starts the rotational speed control so as to maintain the rotational speed Rmg of the motor/generator M/G at the engine start rotational speed Res (see step #54 in FIG. 5).

Thereafter, the control device 3 continues to perform the rotational speed control for maintaining the rotational speed Rmg of the motor/generator M/G to the engine start rotational speed Res (see step #58 in FIG. 5). Meanwhile, the operating pressure P1 of the first clutch C1 is increased until it reaches the full engagement pressure P1e at which the first clutch C1 reaches a state of full engagement (see step #57 in FIG. 5) to start the engine E (area K). At this time, the output torque Tmg of the motor/generator M/G is increased only by the amount of torque required to crank the engine E.

After the engine E has started running, the control device 3 leaves the operating pressure P2 of the second clutch C2 unchanged as equal to the standby pressure P2s (see step #60 in FIG. 5). Meanwhile, the operating pressure P1 of the first clutch C 1 is set to the standby pressure P1s (see step #61 in FIG. 5). The rotational speed Rmg of the motor/generator M/G is also set to the second clutch wheel-side rotational speed Rw (see step #62 in FIG. 5) (area L).

Following this, the operating pressure P1 of the first clutch C1 is left unchanged as equal to the standby pressure P1s (see step #64 in FIG. 5), and the rotational speed Rmg of the motor/generator M/G is maintained at the second clutch wheel-side rotational speed Rw (see step #66 in FIG. 5). Furthermore, the operating pressure P2 of the second clutch C2 is set to the full engagement pressure P2e (see step #65 in FIG. 5). Thus, a state is achieved in which the wheel W is driven by the driving force of the motor/generator M/G (area M).

Thereafter, engine+motor/generator running is started. More specifically, the output torque Tmg of the motor/generator M/G is decreased while the output torque Te of the engine E is increased. In addition, the operating pressure P1 of the first clutch C1 is increased until it reaches the full engagement pressure P1e (area N). While the operating pressure P1 of the first clutch C1 is being increased from the standby pressure P1s to the full engagement pressure P1e at this time, the output torque Te of the engine E continues to increase and transmission of the output torque Te of the engine E is performed while sliding the first clutch C1 in a half-engaged state. This consequently smoothes fluctuations in the output torque Te that is transmitted to the wheel W side.

With the engine+motor/generator running in a steady state, the output torque. Te of the engine E becomes equal to a torque that is the sum of the request torque Tth and the torque (electricity generating torque) Teg required for generating electricity by the motor/generator M/G. Thus, while the vehicle runs on the output torque Te of the engine E, the motor/generator M/G is operated as a rotationally driven generator (area O).

As described above, when the control processing for engine starting during low speed is being executed, the control device 3 performs the rotational speed control for the motor/generator M/G in the areas J to M where the second clutch C2 is in a released state, and performs the torque control for the motor/generator M/G in the areas H, I, N, and O where the second clutch C2 is in a state of full engagement.

Next, a second exemplary embodiment will be described. Compared with the drive apparatus 1 for a hybrid vehicle according to the first exemplary embodiment, the drive apparatus 1 for a hybrid vehicle according to the present embodiment differs with respect to control processing for engine starting during high speed (see step #04 in FIG. 2). Here, a different control method is used for increasing the operating pressure P1 of the first clutch C1 for starting the engine E (see step #37 in FIG. 4). Other aspects of the second exemplary embodiment are identical to those in the first exemplary embodiment.

More specifically, the drive apparatus 1 for a hybrid vehicle according to the present embodiment differs at the point where the operating pressure P1 of the first clutch C 1 is increased in response to an engine start request in the control processing for engine starting during high speed. At that time, a control is performed that changes the degree of increase in the operating pressure P1 of the first clutch C1, based upon an accelerator opening S and an accelerator opening change speed dS/dt. This point will be described in detail below.

When there is an engine start request and the operating pressure P1 of the first clutch C1 is increased in the control processing for engine starting during high speed, the feedback control expressed by Equation (1) above is also performed in the present embodiment similar to the first exemplary embodiment. More specifically, the control device 3 respectively detects the rotational speed ωmg of the intermediate shaft 10 that is rotationally driven by the motor/generator M/G, and the rotational speed ωe of the crankshaft 11 synchronously rotating with the crankshaft of the engine E. Depending on the difference between the rotational speed ωmg of the intermediate shaft 10 and the rotational speed ωe of the crankshaft 11, feedback control is performed that increases the operating pressure P1 of the first clutch C1 until the difference becomes zero. Equation (1) is shown below again for reference:

$$P1 = Gp(\omega mg - \omega e) + Gi \int (\omega mg - \omega e) dt. \quad (1)$$

Next, according to the present embodiment, a control is performed that changes the degree of increase in the operating pressure P1 of the first clutch C1. This is achieved by setting a control gain of the feedback control, i.e., a proportional gain Gp and an integral gain Gi to variables that change based upon the accelerator opening and the accelerator opening change speed dS/dt.

Note that the accelerator opening change speed dS/dt can be calculated using Equation (3) below:

$$dS/dt = \{S(t) - S(t-\Delta t)\}/\Delta t, \quad (3)$$

where t is the detected time of the accelerator opening, and Δt is the sampling cycle.

Figure 8:
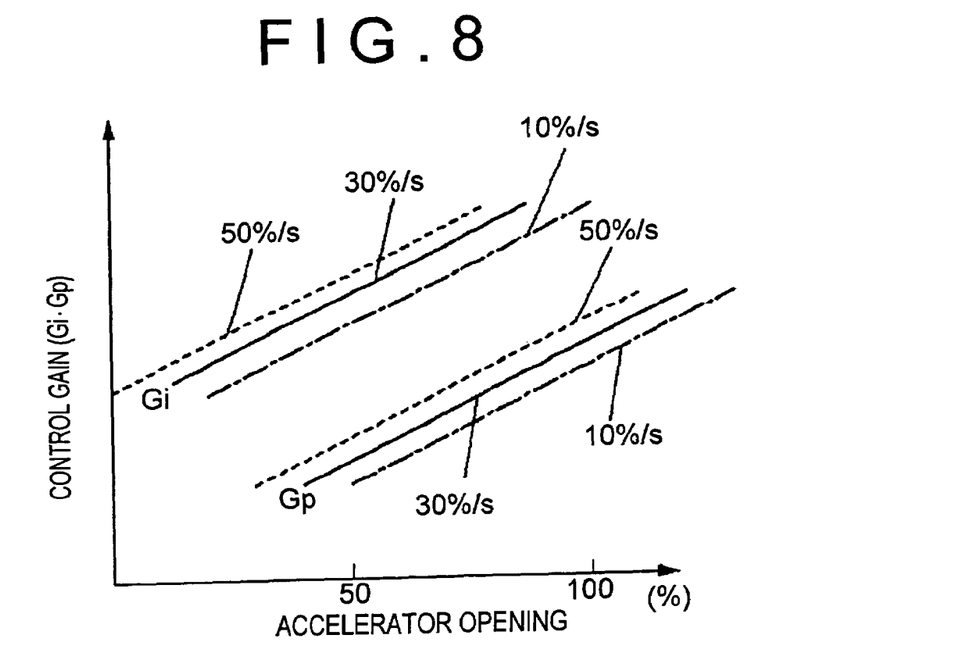
FIG. 8 is an example of a table specifying a relationship between an accelerator opening and an accelerator opening change speed and a control gain in the drive apparatus for a hybrid vehicle according to a second exemplary embodiment.

FIG. 8 is an example of a table specifying a relationship between an accelerator opening S, the accelerator opening change speed dS/dt, and the control gain (proportional gain Gp and integral gain Gi). In the figure, only the three values of 10%/s (percent per second), 30%/s and 50%/s are shown as the accelerator opening change speed dS/dt for simplification purposes. However, other accelerator opening change speeds dS/dt are also preferably specified in the table.

According to the present embodiment, as shown in FIG. 8, the relationships between the accelerator opening S, the accelerator opening change speed ds/dt, the proportional gain Gp, and the integral gain Gi are such that the values for the proportional gain Gp and the integral gain Gi become larger as the accelerator opening S becomes greater, and the accelerator opening change speed dS/dt becomes faster. Such values of the proportional Gp and the integral Gi depend on the accelerator opening S and the accelerator opening change speed dS/dt. It is thus preferable that the values are set based upon tests or the like of values at which sufficient response can be obtained in accordance with the accelerator opening S and the accelerator opening change speed dS/dt with little overshoot or hydraulic vibration in the operating pressure P1 of the first clutch C1.

Thus, in a case where the accelerator opening S is large and the changing speed dS/dt therefor is fast, the driver can be assumed as demanding a large torque fast. Therefore, the time the first clutch C1 is moved to the half-engaged state can be shortened to quickly perform engine starting. Meanwhile, in a case where the accelerator opening S is small and the changing speed dS/dt therefor is slow, the driver can be assumed as not demanding a large torque very fast. Therefore, a control or the like is possible in which the time the first clutch C1 is moved to the half-engaged state can be lengthened to reduce shock during engagement of the first clutch C1.

A third exemplary embodiment will now be described. The drive apparatus 1 for a hybrid vehicle according to the present embodiment, similar to the second exemplary embodiment, differs at the point where the operating pressure P1 of the first clutch C1 is increased in response to an engine start request in the control processing for engine starting during high speed (see step #04 in FIG. 2). At that time, a control is performed that changes the degree of increase in the operating pressure P1 of the first clutch C1, based upon the accelerator opening S and the accelerator opening change speed dS/dt. Other aspects of the third embodiment are identical to those in the first exemplary embodiment. The point of difference will be described in detail below.

According to the present embodiment, in the control processing for engine starting during high speed, a feedback control expressed in Equation (4) below is performed to increase the operating pressure P1 of the first clutch C1 in response to an engine start request. More specifically, depending on the difference between the rotational speed ωe of the crankshaft 11 synchronously rotating with the crankshaft of the engine E and a predetermined target rotational speed ωs, the control device 3 performs a feedback control that increases the operating pressure P1 of the first clutch C1 until the difference becomes zero:

$$P1 = Gp(\omega s - \omega e) + Gi \int (\omega s - \omega e) dt. \quad (4)$$

Next, a control is performed that changes the degree of increase in the operating pressure P1 of the first clutch C1. This is achieved by using the target rotational speed ωs as a variable that changes based upon the accelerator opening S and the accelerator opening change speed dS/dt.

Also note that according to the present embodiment, the proportional gain Gp and the integral gain Gi are set as fixed values. The values for the proportional gain Gp and the integral gain Gi are preferably set based upon tests or the like of values at which sufficient response can be obtained with little overshoot or hydraulic vibration in the operating pressure P1 of the first clutch C1.

As an example, a case will be described in which the predetermined target rotational speed ωs in Equation (4) is set as the sum of the rotational speed ωmg of the intermediate shaft 10 rotationally driven by the motor/generator M/G and a predetermined target rotational speed increment Δω. In this case, Equation (4) can be rewritten as Equation (5) below:

$$P1 = Gp\{(\omega mg + \Delta\omega) - \omega e\} + Gi \int \{(\omega mg + \Delta\omega) - \omega e\} dt. \quad (5)$$

Figure 9:
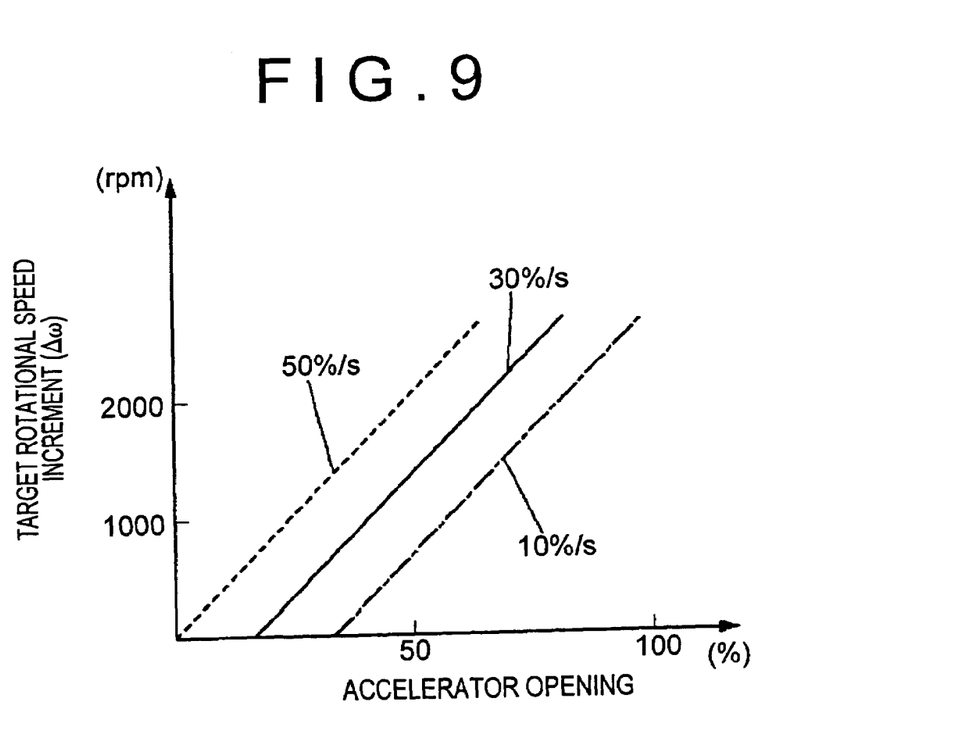
FIG. 9 is an example of a table specifying a relationship between an accelerator opening and an accelerator opening change speed and a target rotational speed increment in the drive apparatus for a hybrid vehicle according to a third exemplary embodiment.

FIG. 9 is an example of a table specifying a relationship between the accelerator opening S, the accelerator opening change speed dS/dt, and the target rotational speed increment Δω. In the figure, only the three values of 10%/s (percent per second), 30%/s and 50%/s are shown as the accelerator opening change speed dS/dt for simplification purposes. However, other accelerator opening change speeds dS/dt are also preferably specified in the table.

According to the present embodiment, as shown in FIG. 9, the relationships between the accelerator opening S, the accelerator opening change speed dS/dt, and the target rotational speed increment Δω is as follows. The target rotational speed increment Δω is set to zero in a region where the accelerator opening S is small and the accelerator opening change speed dS/dt is slow. Accordingly, the target rotational speed ωs in such a case coincides with the rotational speed increment ωmg of the intermediate shaft 10. Additionally, the value for the target rotational speed increment Δω is set to increase in accordance with increases in the accelerator opening S and a faster accelerator opening change speed dS/dt.

Thus, in a case where the accelerator opening S is large and the changing speed dS/dt therefor is fast, the driver can be assumed as demanding a large torque fast. Therefore, a control that increases the operating pressure P1 of the first clutch C1 in a short amount of time is performed by setting the value for the target rotational speed ωS greater than the rotational speed ωmg of the intermediate shaft 10. This, in turn, allows the time the first clutch C1 is moved to the half-engaged state to be shortened to quickly perform engine starting. Meanwhile, in a case where the accelerator opening S is small and the changing speed dS/dt therefor is slow, the driver can be assumed as not demanding a large torque very fast. Because the value for the target rotational speed (Ds coincides with the rotational speed ωmg of the intermediate shaft 10, a control is performed in which the operating pressure P1 of the first clutch C1 is increased as usual in accordance with a difference between the rotational speed ωmg of the intermediate shaft 10 and the rotational speed ωe of the crankshaft 11.

According to the control in the present embodiment, a value that fluctuates in accordance with the accelerator opening S and the accelerator opening change speed dS/dt is set only as the target rotational speed ω. Therefore, compared with the exemplary second embodiment, this has the advantage of facilitating calibration operations, although it is not suitable for minute modulation of the hydraulic response of the operating pressure P1.

Regarding the second and third exemplary embodiments, a description was given of controls performed that changed the degree of increase in the operating pressure P1 of the first clutch C1, based upon both the accelerator opening S and the accelerator opening change speed dS/dt. Naturally, however, another exemplary embodiment is one in which a control changes the degree of the increase in the operating pressure P1 of the first clutch C1 based upon only one of the accelerator opening S and the accelerator opening change speed dS/dt.

Furthermore, a description was given in the first to third exemplary embodiments regarding controls that increased the operating pressure P1 of the first clutch C1 to start the engine E (see step #37 in FIG. 4) in control processing for engine starting during high speed (see step #04 in FIG. 2). Based upon the Equations (1), (3) and (4), a control is performed on a case-by-case basis that calculates and determines the operating pressure P1 of the first clutch C1. Another exemplary embodiment is one in which a control is performed that creates a table in advance from calculation results using the Equations (1), (3) and (4); the table is then stored in the memory 23 of the vehicle control device 16 or the like and used as a reference to set the operating pressure P1.

A description was given in the above embodiments of a structure in which a motor/generator M/G side rotational speed of the first clutch C is detected using the rotational speed ωmg of the intermediate shaft 10. In addition, the engine E side rotational speed of the first clutch C1 is detected using the rotational speed ωe of the crankshaft 11. However, the structure for detecting the rotational speeds on both sides of the first clutch C1 is not limited to such. It is also possible to employ a structure that respectively detects the rotational speeds on both sides of the first clutch C1 directly or indirectly from the rotational speeds of other portions. Accordingly, another exemplary embodiment is one that employs a structure providing rotation sensors on the motor/generator M/G side and the engine E side of the first clutch C1 to directly detect the rotational speeds.

Furthermore, it is also possible, for example, to indirectly detect the rotational speeds on both sides of the first clutch C1 by detecting the rotational speeds of the rotor of the motor/generator M/G and the crankshaft of the engine E, or the like. Note that in such a case, it is even more preferable to set the Equations (1), (3) and (4) for determining the operating pressure P1 of the first clutch C1 in accordance with these detected rotational speeds.

What is claimed is:

1. A drive apparatus for a hybrid vehicle, comprising:
   a motor;
   a clutch that transmits and cuts off a driving force between the motor and an engine; and
   a control device that performs an operation control for the motor and the clutch, wherein the control device:
      increases an operating pressure of the clutch to start a transmission of torque from the motor to the engine side and detects a transmission torque to be transmitted via the clutch if there is an engine start request during driving of a wheel by the motor, and
      performs a control that sets an output torque of the motor as equal to a torque that is the sum of the transmission torque and a request torque for wheel driving, which is determined based upon an accelerator opening, wherein the detection of the transmission torque is performed by calculating the transmission torque based upon an operating pressure of the clutch.

2. The drive apparatus for a hybrid vehicle according to claim 1, wherein the control device changes a degree of increase in the operating pressure of the clutch based upon one or both of an accelerator opening and an accelerator opening change speed, in the case of an engine start request during driving of the wheel by the motor to increase the operating pressure of the clutch.

3. The drive apparatus for a hybrid vehicle according to claim 1, wherein the control device performs a feedback control that increases the operating pressure of the clutch depending on a difference between a motor-side rotational speed and an engine-side rotational speed of the clutch, and changes a control gain thereof based upon one or both of the accelerator opening and the accelerator opening change speed, in the case of an engine start request during driving of the wheel by the motor to increase the operating pressure of the clutch.

4. The drive apparatus for a hybrid vehicle according to claim 1, wherein the control device performs a feedback control that increases the operating pressure of the clutch depending on a difference between an engine-side rotational speed of the clutch and a predetermined target rotational speed, and changes the target rotational speed based upon one or both of the accelerator opening and the accelerator opening change speed, in the case of an engine start request during driving of the wheel by the motor to increase the operating pressure of the clutch.

5. A control method of a drive apparatus for a hybrid vehicle having a motor and a clutch that transmits and cuts off a driving force between the motor and an engine, the control method comprising:
   increasing an operating pressure of the clutch to start the transmission of torque from the motor to the engine side;
   detecting a transmission torque to be transmitted via the clutch if there is an engine start request during driving of a wheel by the motor; and
   performing a control that sets an output torque of the motor as equal to a torque that is the sum of the transmission torque and a request torque for wheel driving, which is determined based upon an accelerator opening, wherein the detection of the transmission torque is performed by calculating the transmission torque based upon an operating pressure of the clutch.

6. A drive apparatus for a hybrid vehicle that performs a control during driving of a wheel by a motor to increase an operating pressure of a clutch that transmits and cuts off a driving force between the motor and an engine, and transmits torque from the motor to the engine side to start the engine, wherein:

a transmission torque to be transmitted via the clutch is detected based upon the operating pressure of the clutch,     an output torque of the motor is calculated as the sum of the transmission torque and a request torque for wheel driving, which is determined based upon an accelerator opening, and     the detection of the transmission torque is performed by calculating the transmission torque based upon an operating pressure of the clutch.

\* \* \* \* \*